July 11, 1961    E. L. ROSE    2,991,629
TIRE INFLATING DEVICE
Filed Oct. 29, 1957
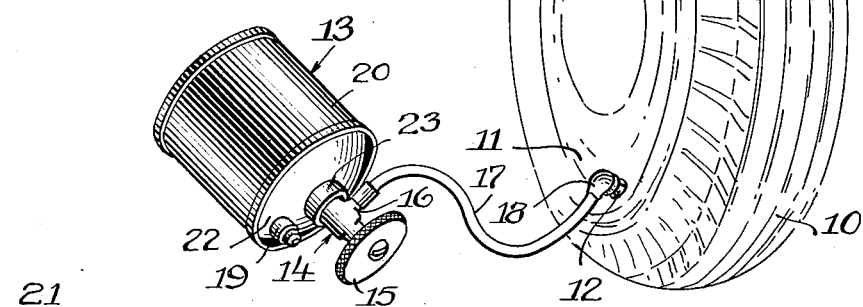
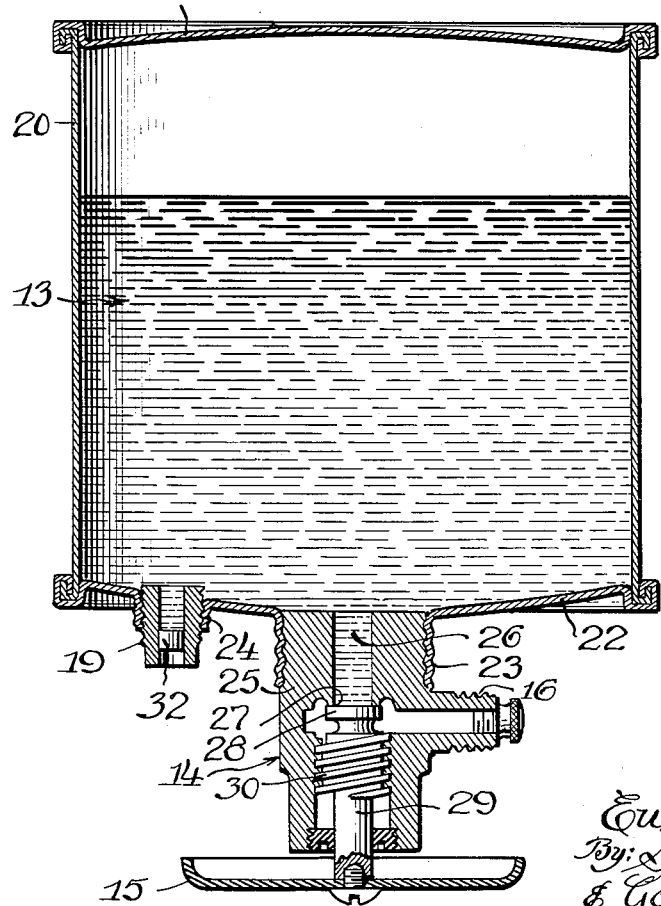
Inventor,
Eugene L. Rose,
By: Schneider, Dressler
& Goldsmith, Attys.

United States Patent Office 2,991,629
Patented July 11, 1961

2,991,629
TIRE INFLATING DEVICE
Eugene L. Rose, Highland Park, Ill., assignor to Gene Rose Company, Inc., a corporation of Illinois
Filed Oct. 29, 1957, Ser. No. 693,085
5 Claims. (Cl. 62—48)

The present invention relates to the inflation of pneumatic tires, particularly automobile tires and to combinations of compositions and containers which are particularly adapted for the inflation of automobile and similar tires.

The present invention provides a tire-inflating gas in a lightweight inexpensive pressure container which is immediately available for the inflation of a tire, such as an automobile tire, when the same becomes flat on the road. The contents of the container provide a source of pressure for the safe inflation of a tire and will maintain a substantially uniform pressure over a wide range of temperature. In its preferred form, the present invention provides for a healant material which will soften and swell the damaged rubber surfaces within the tire which is inflated and which will thereby lengthen the time during which the tire will remain inflated.

Many flat tires are caused by small air leaks so that they can be inflated and will remain inflated for a half-hour or more thereby permitting the driver to safely drive to a service station where the tire can be replaced conveniently and the damaged tire suitably repaired.

Some flat tires are caused by somewhat larger air leaks so that, while the tire can be inflated, it will not hold the inflation pressure while the vehicle is being operated. As a result, the temporarily inflated tire quickly deflates.

In accordance with the present invention, a conventional low pressure aerosol container (instead of a heavy and costly "bomb") is filled with a liquid hydrocarbon having a vapor pressure of at least about 5 p.s.i.g. at 0° C. and a substantially non-condensable gas, such as carbon dioxide, to provide within the container a combination of liquid and gas which, within the temperature range which can normally be expected to be encountered, will provide a substantially uniform pressure. Thus, when low temperatures such as 0° F. are reached, the container will still provide substantial pressure to permit the contents thereof to be transferred to an automobile tire and to provide in said tire substantial inflating pressure. In the same manner, when elevated temperature, such as 100° F. is reached, the pressure of the mixture within the container will still be sufficiently low so that the inexpensive containers which are preferably utilized in accordance with the invention will not burst.

Briefly stated, the invention provides at low temperature enough gas under pressure within the container to deliver the liquid contents of the container to the tire where the liquid will volatilize and inflate the tire. At the same time, at elevated temperatures, the pressure will still be below the bursting pressure of the container and there will still be enough liquid present within the container, in accordance with a feature of the invention, to maintain a healant material capable of softening the rubber of the tire in solution for delivery to the automobile tire when the contents of the container are delivered to the tire, liquid portion first.

In the preferred form of the invention, the liquid hydrocarbon has dissolved therein a liquid plasticizer for rubber which is forced into the tire with the liquid fluorinated hydrocarbon. The plasticizer is distributed throughout the tire by the volatilization of the liquid fluorinated hydrocarbon within the tire so that the rubber surfaces within the tire will be softened and swelled to seal or heal the leak and retain the tire-inflating gas until a more permanent repair can be made.

The details of the invention will become apparent in the description which follows, taken in conjunction with the accompanying drawings in which:

FIGURE 1 is a perspective view showing a pressurized container operatively connected to the valve of a tire for the purpose of inflating the tire to approximately conventional tire pressure; and FIG. 2 is a sectional view showing an illustrative pressurized container with the gas-liquid composition of the invention confined within the same, the container being in position to deliver the composition to the tire.

In accordance with the invetnion, there is provided, in combination with a container capable of withstanding pressure, a liquid hydrocarbon or mixtures thereof and a substantially non-condensable gas.

The liquid hydrocarbon employed has a vapor pressure in excess of about 5 p.s.i.g. at 0° F., and a vapor pressure of less than 200 p.s.i.g. at 100° F. and preferably less than 150 p.s.i.g.

The term "liquid hydrocarbon" as used herein will be understood to refer to both halogen-substituted and non-substituted hydrocarbon. The preferred liquid hydrocarbons are the fluorinated hydrocarbons which have from one to four carbon atoms in the molecule and suitable vapor pressures. The most satisfactory compounds are the chlorinated fluorinated alkanes containing up to two carbon atoms in the molecule.

A particularly preferred volatile liquid is dichloro difluoro methane which has a vapor pressure of 8 p.s.i.g. at 0° F. and a vapor pressure of 70 p.s.i.g. at 70° F. Another preferred volatile liquid is monochloro difluoro methane which is more volatile than dichloro difluoro methane and which has a vapor pressure of 122.5 p.s.i.g. at 70° F. Other suitable fluorinated hydrocarbons are 1,1-difluoroethane, 1-chloro-1,1-difluoro ethane and such heavier molecular weight fluorinated hydrocarbons such as perfluoropropane and perfluorobutane.

The liquid component having minimum and maximum vapor pressure as previously set forth may be constituted by a single chemical compound as previously illustrated or by a plurality of chemical compounds in an admixture which exhibits a total effect of vapor pressure within the stated limits. Thus, dichloro difluoro methane may be employed in admixture with more volatile components such as monochloro difluoro methane to provide intermediate vapor pressures. Non-fluorinated liquid hydrocarbons of suitable vapor pressure such as isobutane, propane and isopropane may also be admixed with the fluorinated liquid hydrocarbons, but it is preferred not to use such non-fluorinated hydrocarbons as the sole liquid constituent because of their inflammability.

Volatile liquid hydrocarbons are not adapted to serve the purpose of the invention alone. Containers filled with fluids under pressure and intended for inflating an automobile tire are carried with the automobile and are subjected to widely varying temperature conditions. If the fluid which is selected is sufficiently volatile to enable delivery of the container contents to the tire and the inflation thereof at low temperature, then at elevated temperature the pressure within the container would be excessive and inexpensive sheet metal containers could not be safely employed. If the container included a safety valve, the contents of the container would be unnecessarily lost when the safety valve opened to relieve the excessive pressure created at elevated temperature.

On the other hand, if the fluid selected is of low volatility so that elevated temperature does not lead to excessive pressure, then when low temperature is encountered the fluid would fail to function because of insufficient volatility to insure delivery of the contents of the container to the tire and the inflation thereof.

Various gases which will not liquefy under the conditions of pressures and temperatures which exist within the container are therefore employed in combination with the liquid hydrocarbon. Carbon dioxide is particularly preferred and nitrogen is a desirable alternative.

The relative proportions of liquid and non-liquefiable gas within the container in accordance with the invention is preferably limited so that the liquid component occupies from about 80% to 95% by volume measured at $-20°$ F. based on the total volume confined within the container. In this way, and employing sufficient non-liquefiable gas to increase the pressure within the container to a total pressure of about 50–110 p.s.i.g. at the coldest outdoor temperatures normally encountered, there is provided sufficient pressure to expel the liquid component from the container at these low temperatures. There is also sufficient liquid to permit a container of small volume to be used for the inflation of an average size automobile tire to approximately conventional inflation pressure of from 20–30 p.s.i.g. and to maintain a liquid healant in solution for delivery to the tire with the liquid component.

As will be understood, the pressure of the non-liquefiable gas will vary with the temperature. However, this variation is small. At low temperatures, delivery pressures of at least about 50 p.s.i.g. are maintained. On the other hand, the proportional pressure increase of a volatile liquid as the boiling temperature is exceeded is quite rapid. In the invention the liquid component does not volatilize appreciably until its vapor pressure exceeds the pressure in the space above the liquid. In this way, and using dichloro difluoro methane, for example, the pressure of the non-liquefable gas is not exceeded at normal room temperature of 70° F. Thus, using a carbon dioxide pressure of 80 p.s.i.g., there is only a minor increase in pressure from 0° F. to 70° F. and substantially no change in liquid volume. Further increase in temperature increases the pressure. However, only the liquid component need be considered in determining the pressure, and the selection of liquid hydrocarbons having a vapor pressure of less than 200 p.s.i.g. at 100° F. makes it unlikely that normal storage conditions will produce dangerous pressures.

In the selection of the liquid component and the pressure of the non-condensable gas which is to be employed, it is preferred that the partial pressure of the non-condensable gas within the container exceed the vapor pressure of the liquid component over the major portion of the temperature range of 0° F. to 100° F.

In the filled container, a portion of the volume of the container is filled with liquid and the remaining volume of the container is filled with gas under pressure. The specific manner of filling is not vital to the invention. The liquid hydrocarbon may be filled under conventional refrigeration techniques and the non-condensable gas by pressure filling through the valve, or both the liquid hydrocarbon and the non-condensable gas may be pressure filled.

In accordance with a feature of the invention, a liquid plasticizer for rubber is dissolved in the liquid hydrocarbon. Examples of such plasticizers are methylene chloride, trichloro-ethylene and other liquid chlorinated hydrocarbons which have a plasticizing effect on rubber to soften and swell the same. Other suitable liquid plasticizers are aliphatic and aromatic esters of polybasic acids such as dimethyl phthalate and tricresyl phosphate.

The plasticizer is usually employed in a small amount, e.g., from about 1% to 20% by weight of plasticizer based on the weight of both the plasticizer and liquid hydrocarbon. In some instances, depending upon the vapor pressure of the liquid hydrocarbon employed, amounts of plasticizer up to 50% may be used. Preferably, from 3% to 10% of the plasticizer is employed.

It is known to employ gums and resins for the purpose of sealing injuries within a tire. Some of these gums or resins cannot be well delivered and distributed by means of fluorinated liquids since they are not soluble therein. In the main, they are not as satisfactory as the healants used in the present invention. In accordance with the invention, the healant is not a gum or a resin but a plasticizer for rubber and it is distributed within the tire by the delivery of liquid to the tire and the volatilization of the volatile liquid component in which the plasticizer is dissolved.

Referring to the accompanying drawing, and with particular reference to FIG. 1, the numeral 10 designates a deflated automobile tire of conventional construction which is mounted upon a rim 11 through an opening in which projects the conventional tire valve 12.

The numeral 13 designates a pressurized container which is constructed of sheet metal and which is more particularly illustrated in FIG. 2. The container 13 is provided with a valve 14 having an operating handle 15 and a side arm 16 to which may be secured a flexible tube 17 leading to a conventional valve element 18 which opens the tire valve 12 when pressed thereagainst. The numeral 19 generically indicates a safety device which is preferably present to permit the harmless discharge of the contents of the container 13 in the event that unusually high temperatures cause pressures to be developed within the container which too closely approximate the bursting pressure of the container. Such high temperatures are sometimes encountered in the trunk of an automobile on an abnormally hot day.

The container 13 is preferably operated in its inverted position, as shown in both FIGS. 1 and 2. In the inverted position it will deliver the liquid portion of the gas-liquid composition first which insures the complete delivery of the container contents into the tire, particularly in colder weather when the vapor pressure of the liquid composition is lower. Further, it is preferred that the hydrocarbon, and the healant plasticizer dissolved therein, be delivered as a liquid to the tire to assist the healant in reaching the leak in the tire.

Referring more particularly to FIG. 2, the container 13 is constructed of sheet metal and comprises a body 20, lower end 21 and an upper end 22. The upper end 22 is formed with threaded openings 23 and 24 which receive the valve 14 and the safety device 19.

The valve 14 is of any conventional construction. As illustrated, the valve comprises a cylindrical main body 25 having an orifice 26 leading to a seat 27. Seat 27 is normally closed by head 28 which is pressed against seat 27 by a stem 29 which is threadedly engaged, as shown at 30, with the interior of the main body 25. The valve head 28 is moved toward and away from the seat 27 by rotation of the handle 15, which is secured to the stem 29. Numeral 32 indicates a low melting point metal which melts at unusually excessive pressures.

The invention is exemplified by the following example.

A sheet metal container of 12 oz. capacity and constructed as shown in FIG. 2 was filled to 85% of its volume with dichloro difluoro methane. The remainder of the container was then filled with carbon dioxide gas under pressure of 80 p.s.i.g.

The container was capable of inflating a conventional 670 x 15 tire from a completely flat condition to about 26 p.s.i.g. at 70° F. Satisfactory inflation of the tire to permit operation of the vehicle was also accomplished at temperatures as low as about 0° F. and as high as 100° F. Even at elevated temperatures of about 100° F. the tire was not overinflated because of the limited quantity of gas which is produced within the tire and which is regulated by the fact that the major source of gas within the container and not from the gaseous component, the mass of which is small in comparison with the mass of the liquid.

The foregoing example was repeated with the exception that dissolved within the liquid component was 5% by weight of a soluble liquid plasticizer. Several trials were made and successful healing action, as evidenced by substantially lengthened periods of inflation, was achieved using as the plasticizer, methylene chloride, trichloro ethylene, dimethyl phthalate and tricresyl phosphate.

It will be understood that the foregoing description is intended to be illustrative, rather than restrictive, and the invention as broadly claimed is in no way limited thereby.

I claim:

1. A package comprising a container adapted to hold fluid under pressure, said container having a portion of its volume filled with volatile liquid having a vapor pressure of at least about 5 p.s.i.g. at 0° F. and not more than 200 p.s.i.g. at 100° F., said volatile liquid containing a liquid plasticizer for rubber dissolved therein, the remainder of said container being filled with a substantially non-condensable gas so that the gas pressure within the container is from about 50 to about 110 p.s.i.g. measured at 0° F.

2. A package comprising a container adapted to hold fluid under pressure, said container having a major portion of the volume of said container measured at −20° F. filled with a fluorinated liquid selected from the group consisting of fluorinated alkanes and fluorinated chloro alkanes in which said alkane contains up to 2 carbon atoms in the molecule, said fluorinated liquid having a vapor pressure of at least about 5 p.s.i.g. at 0° F. and not more than about 200 p.s.i.g. at 100° F., said fluorinated liquid containing a liquid plasticizer for rubber dissolved therein, the remainder of said container being filled with a substantially non-condensable gas so that the gas pressure within the container is from about 50 to 110 p.s.i.g. measured at 0° F.

3. The package recited in claim 1 in which said plasticizer is a liquid ester of a polybasic acid.

4. The package recited in claim 1 in which said plasticizer is selected from the group consisting of methylene chloride, trichloro ethylene, dimethyl phthalate and tricresyl phosphate.

5. The package recited in claim 1 in which said plasticizer is present in an amount of from about 1% to 20% by weight based on the combined weight of the liquid hydrocarbon and plasticizer.

References Cited in the file of this patent

UNITED STATES PATENTS

| Number | Name | Date |
|---|---|---|
| Re. 19,148 | Woodford | Apr. 24, 1934 |
| 1,297,310 | August | Mar. 18, 1919 |
| 2,184,895 | Mitchell | Dec. 26, 1939 |
| 2,679,140 | Burchett | May 25, 1954 |
| 2,723,200 | Pyenson | Nov. 8, 1955 |
| 2,728,495 | Eaton | Dec. 27, 1955 |
| 2,748,984 | Seymour | June 5, 1956 |
| 2,748,985 | Seymour | June 5, 1956 |
| 2,812,885 | Bok et al. | Nov. 12, 1957 |
| 2,815,152 | Mills | Dec. 3, 1957 |
| 2,944,038 | Hunter | July 5, 1960 |